United States Patent Office 3,654,210
Patented Apr. 4, 1972

3,654,210
AQUEOUS POLYMER DISPERSIONS ON THE BASIS OF POLYTETRA-FLUOROETHYLENE
Jurgen Kuhls and Helmut Hahn, Burghausen, Salzach, and Alfred Steininger, Thalhausen, Germany, assignors to Farbwerke Hoechst Aktiengesellschaft vormals Meister Lucius & Bruning, Frankfurt am Main, Germany
No Drawing. Filed July 28, 1969, Ser. No. 845,504
Claims priority, application Germany, Aug. 7, 1968, P 17 95 078.6
Int. Cl. C08f 45/24
U.S. Cl. 260—29.6 F 12 Claims

ABSTRACT OF THE DISCLOSURE

The present invention relates to aqueous dispersions of polymers on the basis of polytetrafluoroethylene. The polymeric particles have an average diameter of 0.2 to 0.5μ and consist of a core made from 90–99% by weight of tetrafluoroethylene and 1–10% by weight of certain halogen containing comonomers and a shell of tetrafluoroethylene homopolymer. This polymeric material has improved properties for paste extrusion processes.

---

The present invention relates to novel high molecular weight dispersion polymers on the basis of polytetrafluoroethylene especially suitable for paste extrusion through nozzles with increased reduction ratios under low pressures.

In U.S. Pat. 3,142,665 and Belgian Pat. 654,084 high molecular weight dispersion polymers consisting of at least 98% of polytetrafluoroethylene have been proposed which can be extruded in the form of a paste with a reduction ratio of up to 10,000:1 and which are obtained by polymerizing tetrafluoroethylene in the presence of so-called modifiers. Besides non-polymerizable compounds, such as methanol or hydrocarbons, there are used perfluoroalkyl- and perfluoroalkoxy-ethylene compounds that are not capable of being polymerized under the polymerization conditions.

The presence of the said modifiers leads to a technically undesired retardation of the overall reaction rate up to a factor of 1.5 which is said to be necessary, however, for the formation of the properties of the polymers. This behavior is due to the fact that the modifiers act, in the first place, as chain transfer agents having chain terminating activity owing to which the modifier is preponderantly incorporated at the chain end. According to Belgian Pat. 654,084 the extrudability can be further increased by using the specified modifiers and operating successively at two different polymerization temperatures with two initiator systems adapted to the said temperatures. Besides a retardation of the overall reaction rate, this step complicates the reaction in an undesired manner.

U.S. Pat. 3,088,941 relates to a process for making paste extrudable dispersion polymers according to which a dispersion of a homopolymer of tetrafluoroethylene prepared without using a modifier and having a melting point of the crystalline phase of 327±2° C. is used as seed to obtain larger dispersed particles. In U.S. Pat. 3,142,665 it has been stated, however, that the use of a seed dispersion obtained by homopolymerizing tetrafluoroethylene involves, indeed, a reduction of the measurable extrusion pressure but detrimentally affects the distribution according to size of the dispersion particles. This is due to the fact that in practice it is impossible fully to exclude the undesired new formation of dispersion particles when very small amounts of polytetrafluoroethylene seed dispersion are used and thus particles of uniform size cannot be obtained.

It has now been found that novel tetrafluoroethylene polymers having an improved structure of the particles and capable of being extruded under low pressures can be obtained in advantageous manner by (1) copolymerizing in dispersion in known manner in the presence of emulsifiers 90 to 99% by weight, preferably 94 to 98% by weight, calculated on the copolymer, of tetrafluoroethylene with other monomers of the general formula

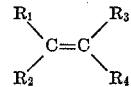

in which at least one of the radicals $R_1$ to $R_4$ represents chlorine, bromine, iodine or hydrogen and the remaining radicals represent, wholly or partially, a halogen atom or a perhalogeno-alkyl or perhalogeno-alkoxy group having 1 to 10 carbon atoms, and (2) introducing the dispersion obtained as seed polymer wholly or partially, without addition of a chain transfer agent, into a second polymerization vessel and carrying out the polymerization by adding tetrafluoroethylene in known manner in the presence of known initiator systems, emulsifiers and the like. The dispersion copolymers of the first stage of the process of the invention can be prepared in an aqueous medium with comonomers such as trifluorobromoethylene, trifluoroiodoethylene, difluorodichloroethylene, tetrachloroethylene, trifluoroethylene or perhalogeno-alkyl derivatives such as pentafluorochloropropylene or 1,2-trifluoromethyl-dichloro-ethylene. It is likewise possible to use mixtures of the specified comonomers.

As comonomer for the manufacture of the seed dispersion trifluorochloroethylene is preferably used. Owing to the small differences in the copolymerization parameters of trifluoro-chloroethylene and tetrafluoroethylene a statistical copolymerization takes place during the course of which the trifluorochloroethylene is substantially incorporated by polymerization after a solids content of the dispersion of about 10% has been reached.

The aforesaid comonomers are used in an amount of from 1 to 10% by weight, preferably 2 to 6% by weight, calculated on the copolymer. The amount of tetrafluoroethylene is chosen in such a manner that the dispersion has a solids content of 5 to 15% by weight, preferably 8 to 13% by weight.

Emulsfiers, for example perfluoroammonium cotanoate or similar compounds, are used in known manner. As initiator there may be used, for example, the system of ammonium persulfate and sodium bisulfite or disuccinic acid peroxide.

The transition point of the crystalline phase of the solid used as seed is in the range of from 290 to 322° C., preferably 300 to 317° C.

The seed dispersion prepared by the process of the invention substantially contains spherical particles of uniform size having an average diameter of 0.01 to 0.2, preferably 0.03 to 0.15 micron.

The seed dispersion obtained or a portion thereof, for example 0.05 to 5% by weight, preferably 1 to 4% by weight, calculated on the solids content, is first introduced into the reaction vessel together with known initiator systems and emulsifiers. Tetrafluoroethylene is then introduced under elevated pressure and at elevated temperature and polymerization is continued until the dispersion contains 15 to 40% by weight, preferably 20 to 35% by weight of solid, calculated on the final dispersion. The initiator systems and emulsifiers may be the same as used in the preparation of the seed polymer dispersion.

The dispersions obtained by the process of the invention preponderantly contain spherical particles of relatively uniform size having an average diameter of 0.2 to 0.5, preferably 0.3 to 0.4 micron. The solid has a transition point of the crystalline phase of 327±2° C.

The essential characteristic by which the dispersion polymers of the present invention differ from those of the cited U.S. patents in the different inner structure of the particles. On the basis of the relationship between molecular weight and polymer density (SSG-standard specific gravity=2.612–0.582 log Mn) standardized in U.S. Pat. 3,142,665 the following observation is made: in the interior of the particles obtained by the process of the invention there is a core of very low molecular weight, corresponding to about 1/50 of its total mass and having a melting point of the crystalline phase of 290 to 322° C., preferably 300 to 317° C. This core is identical with the original seed particle.

In U.S. Pat. 3,142,665 there is claimed as resin property, inter alia, a ratio of the number molecular weight of the shell half ($Mn_S$) to the number molecular weight of the core half ($Mn_C$) of the dispersion particles ($Mn_S/Mn_C$) of less than 3.5. Thorough investigations have revealed that also normal, i.e. non modified dispersion polymers, fall within this broad range. When, however, the novel polymers of the present invention are tested by the methods defined in the above patent specification quite different values of $Mn_S/Mn_C$ of greater than 3.5 are obtained.

A further novel characteristic with the use of trifluorochloroethylene is the ratio of the chlorine content in the core of the particle $[Cl]_c$, corresponding to the seed particle, to the total chlorine content $[Cl]_t$. Depending on the amount of seed used and on the amount of trifluorochloroethylene used for making the seed polymer this ratio is in the range of from 40 to 80. The same ratio is found when the intensities of the C—Cl infrared absorption bands of the core and total particle at 957 cm.$^{-1}$ are compared.

The dispersions obtained by the process of the invention have all properties desired for paste extrusion such as narrow distribution of the particle size, favorable absolute order of magnitude and preponderantly spherical shape. The polymers processed under conditions commonly used for paste extrusion (for example dilution of the dispersion by adding water to a solids content of 10% by weight, with subsequent coagulation by stirring and drying) can be extruded by the methods specified in U.S. Pat 3,142,665 and Belgian Pat. 654,084 up to a reduction ratio of 10,000:1 and thereabove.

After having been made into a paste with high boiling hydrocarbons ($C_9$–$C_{12}$) the tetrafluoroethylene polymers of the invention are excellently suitable for the manufacture of profiles, tubes and wire coatings by paste extrusion through nozzles with a reduction ratio of 10,000:1 and thereabove with subsequent drying and sintering.

The process of the invention represents in several respects a considerable improvement of the known processes. Trifluorochloroethylene is cheaper and can be produced in simpler manner than the perfluoroalkoxy or perfluoroethylenes used in the known processes. Moreover, the seed of one copolymerization can be used for producing a great number of polymers of identical structure suitable for paste extrusion, whereas in the known processes a modification must be carried through in each batch. As compared with a conventional polymerization of tetrafluoroethylene, the proper polymerization of the invention does not have any special characteristics or disadvantages, it represents a normal tetrafluoroethylene polymerization. Hence, it follows that the retardation of the polymerization rate deemed necessary for paste extrudability is not observed in the present process. In contradistinction thereto, high amounts of tetrafluoroethylene are absorbed directly after the beginning of polymerization and a latent period as in the presence of modifiers, for example perfluoropropylene, is not observed. Moreover, it is surprising that the polymerization of tetrafluoroethylene takes place exclusively on the seed particles even with higher stirring speed and thus above the usual reaction rate and that the narrow distribution of the size of the seed particles is maintained in the final dispersion.

Still further, considerable advantages are obtained by the fact that a copolymer is used as seed. By diminution or increase of the amount of seed the average diameter of the dispersion particles can systematically be diminished or increased whereby the extrusion pression of the pasty polymers can be varied without any change of other polymerzation parameters. An average decrease of the particle size leads to an increase and an enlargement of the particle size to a diminution of the measurable extrusion pressure. Owing to the fact that the extrusion pressure is proportional to the degree of orientation which, for its part, is proportional to the tensile strength of the unsintered extrudate, the final properties of the material can be varied in simple manner. The observation that even with a reduction of the proportion of seed to far less than 2% by weight, calculated on the solid, a new formation of dispersion particles otherwise occurring does not take place during the main polymerization demonstrates the readiness of the need to polymerization increased by the modification according to the invention.

The following examples serve to illustrate the invention but they are not intended to limit it thereto. Examples 1 to 20 and Table 1 relate to the manufacture of seed dispersions while Examples 21 to 34 deal with the polymer pastes made therewith.

EXAMPLES 1 TO 20

The seed dispersions were produced with the comonomers specified in the following Table 1 according to the following method:

A 40 liter autoclave equipped with impeller or anchor stirrer and a cooling cycle filled with glycol/water was charged with 26 liters of de-ionized water, 30 grams of perfluoroammonium octanoate, 2 grams of sodium bisulfite and 2.2 kilograms of a hydrocarbon oil. If the comonomers were liquid, they were also added to the aqueous phase at the beginning. The autoclave was scavenged several times by introducing nitrogen until a pressure of 10 atmospheres gauge was reached with subsequent pressure release and the indicated amount of comonomer was forced in. Next, the stirrer was set in motion and when the desired polymerization temperature had been reached, tetrafluoroethylene was introduced until the pressure rose to 19 atmospheres gauge. The indicated amount of initiator dissolved in water was pumped in and when a fall in pressure was observed the pressure was again raised to 19 atmospheres gauge by adding further amounts of tetrafluoroethylene until the desired solids content of 9.5 to 13% was reached. The pressure of the autoclave was released, the dispersion was cooled and the supernatant oil was separated.

The average diameter of the dispersion particles obtained is indicated in the last column of Table 1.

Referring to Table 1

(1) Anchor stirrer instead of impeller.

(2) After 10 minutes the stirring speed was reduced from 180 to 130 revolutions per minute.

(3) With 0.9 gram of ammonium persulfate and 1 gram of sodium bisulfite.

(4) With 1.2 grams of ammonium persulfate and 2 grams of sodium bisulfite.

(5) $CF_2$=$CFCl$ was previously mixed with the calculated total amount of tetrafluoroethylene and this mixture was used for polymerization.

(6) A 150 liter autoclave was used as reaction vessel.

TABLE 1.—PRODUCTION OF SEED DISPERSIONS

| Example number | Temp., °C. | Comonomers | Amount, g. | Reaction period/hrs. | Average diameter of particles, micron |
|---|---|---|---|---|---|
| 1(1) | 28 | | | 2.2 | 0.1 |
| 2(2) | 28 | CF₂=CFCl | 60 | 2.2 | 0.1 |
| 3 | 28 | Same as above | 135 | 2.4 | 0.1 |
| 4 | 28 | ....do | 180 | 1.3 | 0.075 |
| 5 | 28 | ....do | 220 | 1.2 | 0.05 |
| 6 | 33 | ....do | 250 | 0.8 | 0.05 |
| 7 | 37 | ....do | 180 | 0.8 | 0.05 |
| 8(2) | 37 | ....do | 180 | 1.4 | 0.05 |
| 9(3) | 37 | ....do | 180 | 2.0 | 0.05 |
| 10(4)(1) | 28 | ....do | 180 | 2.4 | 0.05 |
| 11(5) | 30 | ....do | 180 | 1.2 | 0.05 |
| 12(6) | 37 | ....do | 700 | 2.0 | 0.05 |
| 13 | 28 | CF₂=CFBr | 45 | 1.8 | 0.05 |
| 14 | 30 | CF₂=CFI | 40 | 1.7 | 0.05 |
| 15(1) | 30 | CF₂=CFH | 25 | 1.9 | \|0.1 |
| 16 | 30 | CF₂=CFH | 100 | 2.2 | \|0.1 |
| 17 | 30 | CFCl=CFCl | 150 | 1.4 | \|0.1 |
| 18(1) | 29 | CF₂Cl—CF=CF₂ | 180 | 2.2 | \|0.1 |
| 19 | 37 | CF₃—CCl=CCl—CF₃ | 180 | 2.0 | 0.05 |
| 20 | 28 | CCl₂=CCl₂ | 100 | 1.8 | 0.05 |

EXAMPLES 21 TO 34

The pasty polymers were produced in the manner described below under the conditions specified in Table 2.

A 40 liter autoclave equipped with impeller and glycol/water cycle was charged with 24.5 liters of water, the indicated amount of perfluoro-ammonium octanoate as emulsifier, 2 grams of sodium bisulfite, the indicated amount of seed dispersion and 2.2 kilograms of hydrocarbon oil. After having set in motion the impeller and reached the indicated polymerization temperature, the autoclave was scavenged with nitrogen as described above and tetrafluoroethylene was introduced until the pressure in the autoclave amounted to 19 atmospheres gauge. 1.9 grams of ammonium persulfate dissolved in water were pumped in and a pressure of 19 atmospheres gauge was maintained by adding tetrafluoroethylene until the dispersion had a solids content of 15 to 40%, preferably 20 to 35%. The pressure was released, the dispersion was cooled and the supernatant oil was separated. After dilution with water to a solids content of 10% by weight the dispersion was allowed to coagulate by rapidly stirring. The extrusion properties of the dried polymers were tested by the methods described in U.S. Pat. 3,142,665 and Belgian Pat. 654,084.

The results are summarized in Table 2 and the quality of the products evaluated as follows:

(1) products with very good paste extrusion properties,
(2) products with less favorable paste extrusion properties,
(3) products with poor paste extrusion properties yielding non uniform articles,
(4) polymers not capable of being extruded as a paste.

In Table 2 there is also indicated the average extrusion pressure $p_{ex}$ and the tensile strength of the unsintered extrudates.

Referring to Table 2

(1) The polymerization temperature was 28° C., in all other examples it was 37° C.

(2) The extrusion properties were tested by the method described in Belgian Pat. 654,084 in all other examples they were tested by the method of U.S. Pat. 3,142,665, column 5.

(3) A 150 liter autoclave was used as reaction vessel.

TABLE 2.—PRODUCTION OF DISPERSION POLYMERS CAPABLE OF BEING EXTRUDED AS A PASTE

| | | | Dispersion stirring | | Dispersion polymer obtained | | Extrusion properties of paste | | |
|---|---|---|---|---|---|---|---|---|---|
| Example number | Emulsifier G. | seed No. (ab. 1) | percent | Revolutions/min. | Reaction period, hrs. | Solid percent | Average diameter micron | $P_{ex}°$ at gauge | Kp./cm.² tensile strength | Evaluation quality |
| 21 | 30 | | | 165 | 3.6 | 25 | | 700 | 14 | 4 |
| 22 (2) | 30 | | | 165 | 5.4 | 35 | | 600 | 16 | 4 |
| 23 | 30 | 1 | 2.0 | 165 | 3.0 | 25 | 0.3 | 550 | 23 | 2-3 |
| 24 (1) | 30 | 2 | 1.3 | 165 | 3.0 | 25 | 0.4 | 550 | 23 | 2 |
| 25 | 20 | 4 | 1.3 | 165 | 3.5 | 25 | 0.4 | 520 | 35 | 1 |
| 26 (2) | | | | | | | | 400 | 40 | 1 |
| 27 | 20 | 7 | 1.3 | 190 | 2.7 | 32 | 0.4 | 560 | 37 | 1 |
| 28 | 60 | 7 | 4.0 | 190 | 2.4 | 25 | 0.25 | 700 | 55 | 1 |
| 29 | 60 | 7 | 4.0 | 190 | 5.0 | 36 | 0.4 | 560 | 38 | 1 |
| 30 (1) (3) | 85 | 8 | 1.3 | 120 | 4.0 | 26 | 0.4 | 580 | 40 | 1 |
| 31 (2) | | | | 115 | | | | 420 | 35 | 1 |
| 32 (1) (3) | 85 | 8 | 1.1 | 120 | 4.0 | 26 | 0.45 | 480 | 40 | 1 |
| 33 (1) | 20 | 13 | 2.0 | 170 | 3.5 | 25 | 0.3 | 700 | 50 | 1 |
| 34 (1) | 20 | 16 | 2.0 | 165 | 2.4 | 24 | 0.3 | 600 | 40 | 1-2 |

What is claimed is:

1. A process for the manufacture of aqueous polymer dispersions on the basis of polytetrafluoroethylene having a solids content of from 15 to 40% by weight which comprises (a) preparing a dispersion having a solids content of from 5 to 15% by weight by copolymerizing 90 to 99% by weight, calculated on the copolymer, tetrafluoroethylene with at least one monomer of the formula:

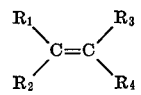

wherein at least one of $R_1$ to $R_4$ stands for chlorine, bromine, iodine or hydrogen while the remaining $R_1$ to $R_4$ represent, wholly or partially, halogen, a perhalogeno-alkyl or a perhalogeno-alkoxy group having 1 to 10 carbon atoms, (b) introducing the dispersion obtained in step (a) as seed polymer into a second polymerization vessel and continuing the polymerization by adding tetrafluoroethylene.

2. The process of claim 1, wherein trifluorochloroethylene is used as comonomer.

3. The process of claim 1, wherein 2 to 6% by weight of comonomer are used, calculated on the copolymer of the seed dispersion (a).

4. The process of claim 1, wherein the seed dispersion (a) has a solids content of from 8 to 13% by weight.

5. The process of claim 1, wherein the seed dispersion (a) is used in an amount of from 0.5 to 5% by weight, calculated on the solids.

6. An aqueous polymer dispersion on the basis of polytetrafluoroethylene consisting essentially of a dispersion of polymer particles, said dispersion having a solids content of 15 to 40% by weight, said particles being substantially spherical particles of uniform size having an average diameter of 0.2 to 0.5 micron, said particles having a core of a copolymer of 90 to 99% by weight tetrafluoroethylene, calculated on the copolymer, with at least one comonomer of the formula:

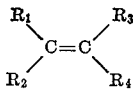

wherein at least one of $R_1$ to $R_4$ stands for chlorine, bromine, iodine or hydrogen while the remaining $R_1$ to $R_4$ represent wholly or partially halogen or a perhalogeno-alkyl or perhalogeno-alkoxy group having 1 to 10 carbon atoms, said particles having a shell of tetrafluoroethylene homopolymer, the ratio of the number molecular weight of the shell to the number molecular weight of the core $Mn_S : Mn_C$ being greater than 3.4, the copolymer of said core having a transition point of the crystalline phase between 290 and 332° C. and an average diameter of 0.01 to 0.2 micron.

7. Polymer dispersions as claimed in claim 6 having a solids content of 20 to 35% by weight.

8. Polymer dispersions as claimed in claim 6, in which the particles have a core consisting of a copolymer of 94 to 98% of tetrafluoroethylene, calculated on the copolymer.

9. Polymer dispersions as claimed in claim 6, in which the particles have a core of a copolymer containing 1 to 10% by weight of trifluorochloroethylene, calculated on the copolymer.

10. Polymer dispersions as claimed in claim 6, in which the particles have a core of an average diameter of 0.03 to 0.15 micron.

11. Polymer dispersions as claimed in claim 6, in which the particles have a core of a copolymer having a transition point of the crystalline phase of 300 to 317° C.

12. Polymer dispersions as claimed in claim 6, in which the particles have an average diameter of 0.3 to 0.4 micron.

References Cited

UNITED STATES PATENTS 3,088,941   5/1963   Uhland _____ 260—92.1
3,142,665   7/1964   Cardinal et al. _____ 260—92.1

HAROLD D. ANDERSON, Primary Examiner

U.S. Cl. X.R.

117—161 UZ; 260—29.6 RU, 884